(12) United States Patent
Schuck, III

(10) Patent No.: US 12,181,681 B2
(45) Date of Patent: Dec. 31, 2024

(54) PLENOPTIC CAMERA MEASUREMENT AND CALIBRATION OF HEAD-MOUNTED DISPLAYS

(71) Applicant: Magic Leap, Inc., Plantation, FL (US)

(72) Inventor: Miller Harry Schuck, III, Erie, CO (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/505,437

(22) Filed: Nov. 9, 2023

(65) Prior Publication Data

US 2024/0077735 A1 Mar. 7, 2024

Related U.S. Application Data

(63) Continuation of application No. 18/004,413, filed as application No. PCT/US2021/040369 on Jul. 2, 2021, now Pat. No. 11,852,828.
(Continued)

(51) Int. Cl.
*G02B 27/01* (2006.01)
*G02B 5/20* (2006.01)
(Continued)

(52) U.S. Cl.
CPC ......... *G02B 27/0172* (2013.01); *G02B 5/201* (2013.01); *G02B 27/0081* (2013.01);
(Continued)

(58) Field of Classification Search
CPC ............ G02B 27/0172; G02B 27/0081; G02B 27/283; G02B 27/62; G02B 27/0025;
(Continued)

(56) References Cited

U.S. PATENT DOCUMENTS

2016/0225191 A1* 8/2016 Mullins ................... G06F 3/013
2018/0130227 A1* 5/2018 Sato .................. G02B 27/0172
(Continued)

FOREIGN PATENT DOCUMENTS

| CN | 110554511 A | 12/2019 | |
|---|---|---|---|
| WO | WO 2019/157571 | 8/2019 | |
| WO | WO-2019157571 A1 * | 8/2019 | ........... A61B 3/0008 |

OTHER PUBLICATIONS

Georgiev and Lumsdaine, "Superresolution with plenoptic camera 2.0," Adobe Tech. Report, Apr. 2009, 9 pages.
(Continued)

*Primary Examiner* — Brent D Castiaux
(74) *Attorney, Agent, or Firm* — Fish & Richardson P.C.

(57) ABSTRACT

A method for measuring performance of a head-mounted display module, the method including arranging the head-mounted display module relative to a plenoptic camera assembly so that an exit pupil of the head-mounted display module coincides with a pupil of the plenoptic camera assembly; emitting light from the head-mounted display module while the head-mounted display module is arranged relative to the plenoptic camera assembly; filtering the light at the exit pupil of the head-mounted display module; acquiring, with the plenoptic camera assembly, one or more light field images projected from the head-mounted display module with the filtered light; and determining information about the performance of the head-mounted display module based on acquired light field image.

14 Claims, 4 Drawing Sheets

Related U.S. Application Data

(60) Provisional application No. 63/048,331, filed on Jul. 6, 2020.

(51) Int. Cl.
    *G02B 27/00*     (2006.01)
    *G02B 27/28*     (2006.01)

(52) U.S. Cl.
    CPC .... *G02B 27/283* (2013.01); *G02B 2027/0138* (2013.01); *G02B 2027/014* (2013.01); *G02B 2027/0178* (2013.01)

(58) Field of Classification Search
    CPC ............ G02B 27/0075; G02B 27/0149; G02B 27/0179; G02B 5/201; G02B 2027/0138; G02B 2027/014; G02B 2027/0178
    See application file for complete search history.

(56) References Cited

U.S. PATENT DOCUMENTS

| | | | | |
|---|---|---|---|---|
| 2018/0152697 | A1* | 5/2018 | DeVaul | G03B 21/60 |
| 2018/0210208 | A1* | 7/2018 | Zhou | G02B 27/1026 |

OTHER PUBLICATIONS

Georgiev et al., "Using focused plenoptic cameras for rich image capture," IEEE Computer Graphics and Applications, Jan./Feb. 2011, pp. 50-61.

International Search Report and Written Opinion in PCT/US2021/040369, mailed on Sep. 29, 2021, 9 pages.

Lumsdaine and Georgiev, "Full resolution lightfield rendering," Tech. Rep., Adobe Systems, Inc., Jan. 2008, 12 pages.

Manakov et al., "A reconfigurable camera add-on for high dynamic range, multispectral, polarization, and light-field imaging," ACM Transactions on Graphics, Jul. 2013, 32(4):47, 12 pages.

Masuda et al., "Single-snapshot 2D color measurement by plenoptic imaging system," Proc. SPIE, Photonic Inst. Engineering, Mar. 2014, 8992V: 9 pages.

Perwaß and Wietzke, "Single lens 3D-camera with extended depth-of-field," Raytrix GmbH, Tech. Bulletin, Feb. 2012, 15 pages.

Extended European Search Report in European Appln. No. 21838509.4, dated Jun. 27, 2024, 8 pages.

Su et al., "Spectrum Reconstruction of the Light-Field Multimodal Imager," IEEE Access, Jan. 2019, 7:9688-9696.

* cited by examiner

PLENOPTIC CAMERA MEASUREMENT AND CALIBRATION OF HEAD-MOUNTED DISPLAYS

CLAIM OF PRIORITY

This application is a continuation of U.S. patent application Ser. No. 18/004,413, filed on Jan. 5, 2023, which is a National Stage Application of International Application No. PCT/US2021/040369, filed Jul. 2, 2021, which claims priority under 35 USC § 119(e) to U.S. Patent Application Ser. No. 63/048,331, filed on Jul. 6, 2020. The entire contents of which the above applications are hereby incorporated by reference.

FIELD OF THE DISCLOSURE

The disclosure relates to measurement and calibration of head-mounted displays and more specifically, to the use of a plenoptic camera for the calibration of eyepieces used in head-mounted displays.

BACKGROUND

Wearable head-mounted display systems include one or more eyepieces through which a user views the external world. The eyepieces are typically formed from transparent, highly refractive materials so that information can be projected to a user through the eyepiece while simultaneously transmitting a view of the external world. In many cases, eyepieces in a head-mounted display undergo a calibration process to normalize the light field displayed to users of the wearable display systems to ensure a consistent image between head-mounted display systems.

In some cases, the calibration process involves evaluation of multiple white field images projected through the eyepiece across a large dynamic range. These images can be acquired using a camera and various neutral density filters. A similar process can be used to evaluate red, green, and blue color balances, and several reliefs and positions from the eyepiece to simulate multiple user pupil locations and inter-pupillary distances. From these images, the calibration process can include adjusting the head mounted display to match the image field to an external standard. In general, these steps should be performed for each and every head-mounted display system, resulting in a time consuming and costly process.

SUMMARY

This disclosure describes methods and systems for calibrating head-mounted displays using a plenoptic camera. A plenoptic camera, which is also referred to as a light field camera, captures information about a light field emanating from a scene. The light field refers to both the intensity of light from the scene and also the direction the light rays are traveling in space. In contrast, a regular camera captures only intensity information about a scene.

In the systems disclosed herein, the optical system for the plenoptic camera features a pupil that is physically accessible for arraying spatially discrete filters across the pupil, enabling multiplexed measurement of different light properties (e.g., luminance, polarization, spectral content) across the pupil. For example, a plenoptic camera assembly in a measurement and calibration system can include an entrance pupil that is external to the camera assembly's lens that provides sufficient physical space for one or more filter arrays. The system can include a stage that positions the head-mounted display under test with the display's exit pupil located at the same place as the entrance pupil for the plenoptic camera.

In some embodiments, the measurement and calibration system can include an optical assembly that provides views from several pupil positions in a single image, allowing calibration of several user pupil positions in one capture, saving measurement and calibration time.

Various aspects of the invention are summarized as follows.

In general, in a first aspect, the invention features a method for measuring performance of a head-mounted display module, the method including arranging the head-mounted display module relative to a plenoptic camera assembly so that an exit pupil of the head-mounted display module coincides with a pupil of the plenoptic camera assembly; emitting light from the head-mounted display module while the head-mounted display module is arranged relative to the plenoptic camera assembly; filtering the light at the exit pupil of the head-mounted display module; acquiring, with the plenoptic camera assembly, one or more light field images projected from the head-mounted display module with the filtered light; and determining information about the performance of the head-mounted display module based on acquired light field image.

Embodiments of the method for displaying an image using a wearable display system can include one or more of the following features. The light can be filtered by a plurality of spatially discrete filters positioned at the pupil of the plenoptic camera assembly. The spatially discrete filters can include color filters. The color filters can include X, Y, Z color matching function color filters. The spatially discrete filters can include polarization filters. The spatially discrete filters can include neutral density filters.

The light can be filtered by a first set of spatially discrete filters and a second set of spatially discrete filters overlapping with the first set, the first and second sets of spatially discrete filters filtering different properties of the light. The properties of the light can be selected from the groups consisting of color, polarization, and intensity.

Acquiring the one or more light field images can include reimaging a real image from the head-mounted display module to a multi-element sensor using a microlens array.

The microlens array can sample portions of an exit pupil of a lens of the plenoptic camera assembly to provide different angular views of the real image from the head-mounted display module.

The plenoptic lens assembly can define a light path from the pupil to a sensor, the plenoptic lens assembly can include a camera lens assembly in the light path defining the pupil of the plenoptic camera assembly and defining an image plane, the plenoptic camera assembly can further include an array of focusing elements in the light path between the image plane and the sensor array.

The information about the performance of the head-mounted display module can include information about at least one of the performance parameters selected from the group consisting of radiance, luminance, color, geometric distortion, virtual image distance, and field curvature.

Determining the information about the performance of the head-mounted display module can include calculating two-dimensional images at multiple different depths over a three-dimensional volume of interest of the head-mounted display module.

Determining the information can further include determining information about one or more properties of each of the two-dimensional images.

The method can further include combining emitted light from multiple different locations of the exit pupil of the head-mounted display module to form multiple overlapping images at a sensor of the plenoptic camera assembly, each of the multiple overlapping images corresponding to a different user view for the head-mounted display module.

In a second aspect, the invention features a method for calibrating a head-mounted display, including measuring a performance of the head-mounted display using the method for measuring performance of a head-mounted display module; and adjusting an operation of the head-mounted display based on the measured performance.

In a third aspect, the invention features a system, including a plenoptic camera assembly including a camera lens defining an image plane, a camera sensor, and a microlens array arranged to image light at the image plane to the camera sensor; a stage for receiving a head-mounted display and positioning the head-mounted display with respect to the plenoptic camera assembly so that so that an exit pupil of the head-mounted display module coincides with a pupil of the plenoptic camera assembly; one or more filter arrays positioned at the pupil of the plenoptic camera assembly, each of the one or more filter arrays including a plurality of spatially discrete filters extending across an aperture of the camera lens; and a system controller in communication with the plenoptic camera assembly and programmed to cause, during operation of the system, acquire one or more light field images projected from the head-mounted display module and determine information about the performance of the head-mounted display module based on the acquired light field image.

Embodiments of the system can include one or more of the following features. One of the filter arrays can include spatially discrete color filters. The spatially discrete color filters can include X, Y, Z tristimulus color filters.

One of the filter arrays can include spatially discrete polarization filters.

One of the filter arrays can include spatially discrete neutral density filters.

The one or more filter arrays can include a first array of spatially discrete color filters and a second array of spatially discrete filters overlapping with the first set, the first and second arrays of spatially discrete filters filtering different properties of the light. The properties of the light are selected from the groups consisting of color, polarization, and intensity.

The system further comprising an optical assembly arranged at the pupil of the plenoptic camera assembly configured to combine light emitted from multiple different locations of the exit pupil of the head-mounted display module to form multiple overlapping images at a sensor of the plenoptic camera assembly, each of the multiple overlapping images corresponding to a different user view for the head-mounted display module.

The optical assembly can include one or more polarizing beam splitters arranged at different locations in exit pupil of the head-mounted display module and a beam combiner arranged in the pupil of the plenoptic camera assembly arranged to receive light from each of the polarizing beam splitters and direct the light from each polarizing beam splitter along a common path to the camera lens.

Other features and advantages will be apparent from the description, the drawings, and the claims.

BRIEF DESCRIPTION OF THE DRAWINGS

In the figures, like symbols indicate like elements.

DETAILED DESCRIPTION

Figure 1:
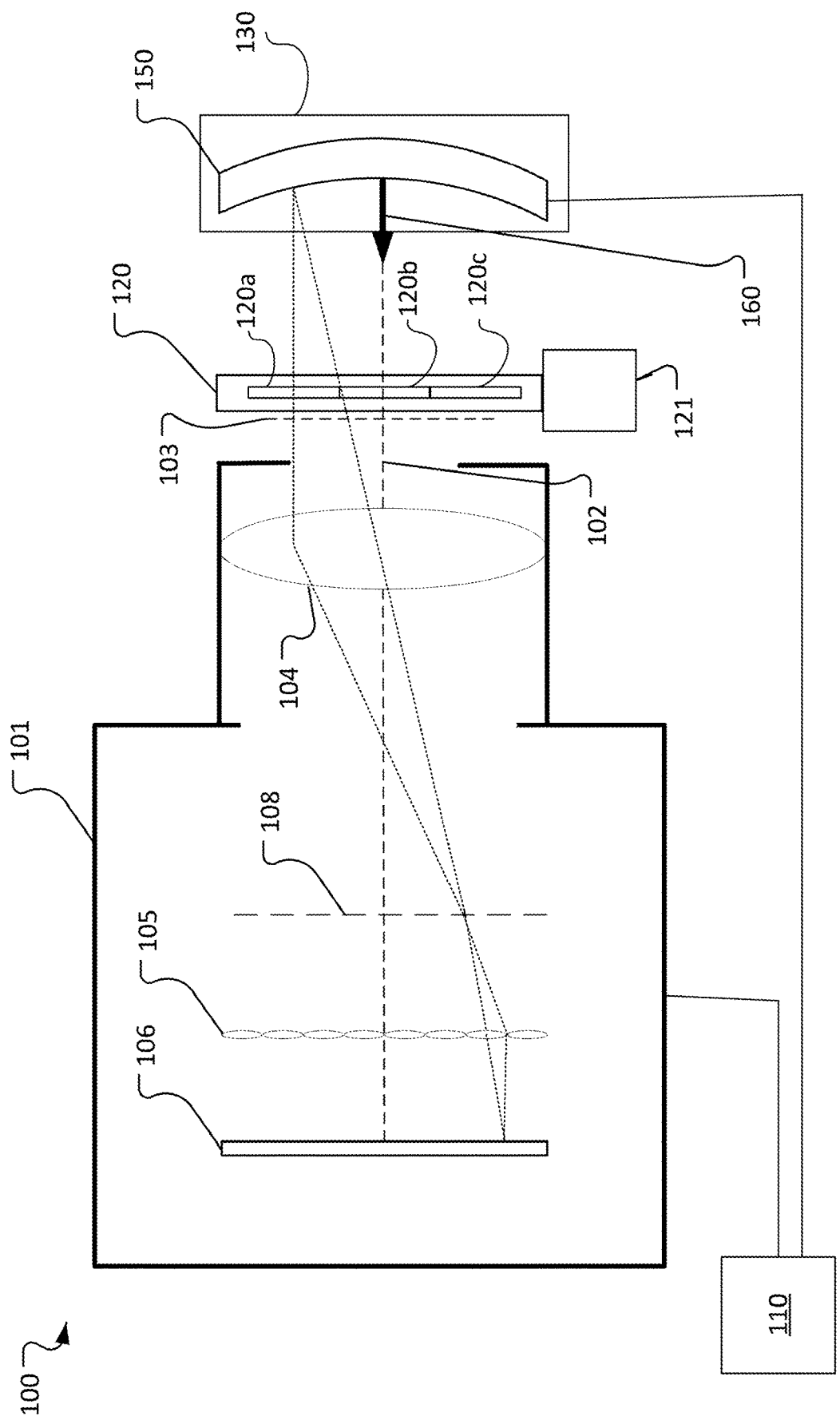
FIG. 1 is a schematic diagram of an example measurement and calibration system for a wearable headset display.

Referring to FIG. 1, an example measurement and calibration system 100 for a wearable headset display 150 (e.g., an eyepiece) includes a plenoptic camera assembly 101, a filter module 120, and a stage 130 for supporting display 150 and positioning it relative to plenoptic camera assembly 101. Specifically, the display 150 is arranged such that the exit pupil of the display 150 coincides with an entrance pupil 103 of the plenoptic camera assembly 101. A system controller 110 (e.g., a computer controller), in communication with plenoptic camera assembly 101 and display 150, is programmed to control the operation of both camera assembly 101 and display 150 to acquire and analyze images from the display in order to calibrate the display.

In general, the entrance pupil 103 is in a location accessible for other optical components that aren't part of the imaging optics of system 100. For example, as depicted in FIG. 1, entrance pupil 103 is external to plenoptic camera assembly 101, in a space between the camera assembly and display 150.

A filter module 120 is positioned at entrance pupil 103. Filter module 120 includes three spatially discrete filters 120a, 120b, and 120c, each located at the same position with respect to axis 102. The filters are spatially discrete because they occupy non-overlapping areas of entrance pupil 103. A mount 121 positions filter array 120 at the appropriate location along axis 102.

Plenoptic camera assembly 101 includes a sensor 106, a microlens array 105, and a camera lens 104 arranged in order along an axis 102 of the camera assembly. Sensor 106, microlens array 105, and camera lens 104 are housed in a common housing that features mounting elements to maintain the relative position of each component and protect each from the environment.

A stage 130 supports display 150 facing plenoptic camera assembly 101 so that light 160 from images projected by display 150 is received by the camera assembly along axis 102. Camera lens 104 images the display 150 to image plane 108. Each microlens of microlens array 105 relays an image of the display to the sensor, however each of the images at sensor 106 captures information about the direction of the light in addition to the intensity. Note that generally the sensor has many more pixels than the microlens array 105 has lenses, allowing each microlens to form an image at a different area of the sensor. Sensor 106 is typically a solid-state image sensor device including a regular array of pixels. For example, the sensor 106 can be a charge-coupled device (CCD) or an active-pixel sensor (CMOS). The resulting image read from sensor 106 corresponds to an array of micro-images, each corresponding to a slightly different angular perspective of the object being imaged (in this case, display 150).

Although camera lens 104 is depicted as a single lens element, typically camera lens 104 is a compound lens, including two or more lens elements that collectively image the display to image plane 108. Generally, camera lens 104 can include spherical, aspheric, conic, or anamorphic lens elements, or any combination thereof, to provide sufficiently low aberration imaging appropriate for system 100.

During operation, plenoptic camera assembly 101 captures light field images projected from display 150 of the head-mounted display module for processing by system controller 110. System controller 110 can be implemented using digital electronic circuitry, or in computer software, firmware, or hardware, or in combinations of one or more of them. For example, in some cases, system controller 110 can be implemented, at least in part, as one or more computer programs (e.g., one or more modules of computer program instructions, encoded on computer storage medium for execution by, or to control the operation of, a data processing apparatus).

A computer storage medium can be, or can be included in, a computer-readable storage device, a computer-readable storage substrate, a random or serial access memory array or device, or a combination of one or more of them. The term "processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-plat form runtime environment, a virtual machine, or a combination of one or more of them. The apparatus and execution environment can realize various different computing model infrastructures, such as web services, distributed computing and grid computing infrastructures.

In general, a variety of different types of filter arrays can be used filter module 120. For example, in some embodiments, filters 120*a*, 120*b*, and 120*c* are neutral density filters each having a different attenuation. For example, filters 120*a*, 120*b*, and 120*c* can attenuate different amounts of light from display 150. Accordingly, in a single capture, sensor 106 can acquire an image volume from display 150 across a high dynamic range, rather than having to capture different intensity levels with different volume captures.

While the filter module 120 depicted in FIG. 1 includes an array of three different filters, other filter array arrangements are possible. Moreover, in some embodiments, multiple filter arrays can be arranged in sequence along axis 102. For example, referring to FIGS. 2A and 2B, a color filter array 220 and a neutral density filter array 222 are designed to be arranged in sequence along the axis so that the measurement and calibration system can acquire a light field image that includes information for different spectral profiles from the display, and for each spectral profile information across a high dynamic range. In this example, filter array 220 is a color filter array with three different color filters 220*a*, 220*b*, and 220*c*. For instance, filter 220*a* can be a filter for CIE 1931 color matching function X, 220*b* can be a filter for CIE 1931 color matching function Y, and filter 220*c* can be a filter for CIE 1931 color matching function Z. Other spectral filter arrays are also possible. The filter array is depicted in planar view, arranged in system 100 so that the axis 102 is perpendicular to the plane of the page.

Filter array 222 is composed of three neutral density filters (e.g., 50% or more attenuation, 80% or more attenuation, 90% or more attenuation) 222*a*, 222*d*, and 222*e* and three transparent windows 222*b*, 222*c*, and 222*f* (i.e., providing little or no light attenuation). Filter arrays 220 and 222 are sized and shaped so that color filter 220*a* overlaps with neutral density filter 222*a* and clear window 222*b* when positioned in the filter module of system 100. Similarly, color filter 220*b* overlaps with neutral density filter 222*d* and clear window 222*c* and color filter 220*c* overlaps with neutral density filter 222*e* and clear window 222*f*.

Accordingly, when arranged together in system 100, filter arrays 220 and 222 provide for light field capture in which part of the entrance pupil samples light at with three different spectral compositions across a high dynamic range as provided by the neutral density filters.

Figure 2C:
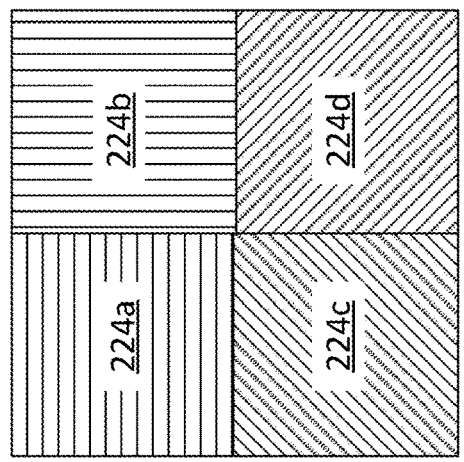
FIG. 2C is a plan view of an example polarizing filter array for use in the system shown in FIG. 1.
Figure 2B:
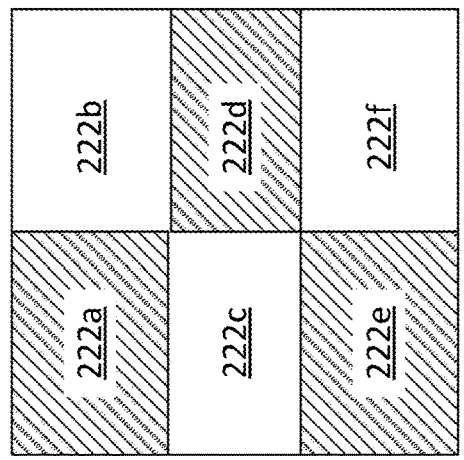
FIG. 2B is a plan view of an example neutral density filter array for use in the system shown in FIG. 1.
Figure 2A:
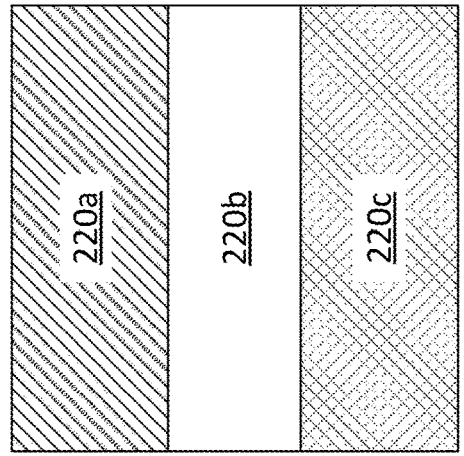
FIG. 2A is a plan view of an example color filter array for use in the system shown in FIG. 1.

FIG. 2C shows a further example of a filter array that can be used in system 100. Filter array 224 includes four filters 224*a*, 224*b*, 224*c*, and 224*d* are each composed of a linear polarizer with a different pass axes orientation. Alternatively, in some embodiments, the four polarization filters can include two linear polarizers with orthogonal axes and two circular polarizers for orthogonal circular polarization states. Light field images acquired using a polarizing filter array can be useful in assessing properties such as birefringence in different components of the display under test.

Other filter array arrangements are also possible. For example, a polarizing filter array can include 24 filters arranged so that four polarizing filters overlap with each filter in filter array 222. With such an arrangement, a single light field image can contain color and polarization information across a high dynamic range.

Figure 3:
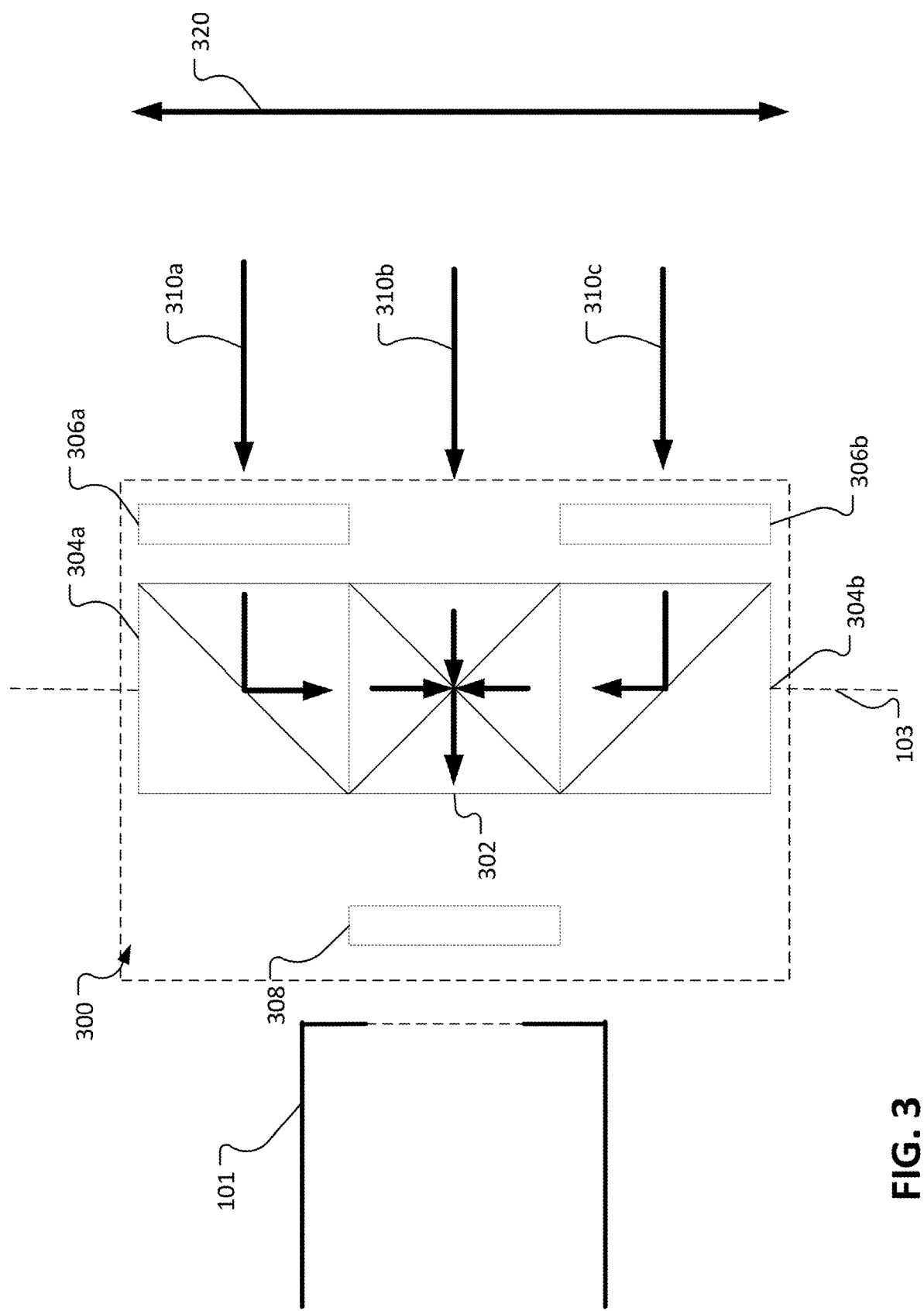
FIG. 3 is a schematic diagram of an example optical assembly that extends the entrance pupil of the plenoptic camera to encompass multiple user pupil positions.

Alternatively, or in addition to the filter module, other components can be positioned in the entrance pupil of the plenoptic camera assembly 101 to provide additional functionality to system 100. For example, in some embodiments, a multiplexing assembly can be used to capture light fields across multiple user pupil positions in a single light field capture. An example of such an assembly is shown in FIG. 3, which depicts an optical assembly 300 arranged at the external entrance pupil 103 of the plenoptic camera assembly 101 to extend the pupil plane and capture a larger section of the exit pupil 320 of the display under test. The optical assembly 300 includes two polarizing beamsplitters (PBSs) 304*a* and 304*b* affixed on opposing sides to a cross prism 302. Two high retardation films 306*a* and 306*b* are positioned between the two polarizing beamsplitters 304*a* and 304*b*, respectively, and the display under test. Optionally, a linear polarizer 308 is positioned between the cross prism 302 and the camera assembly 101.

In general, the exit pupil 320 of a head-mounted display can be significantly larger that the user's pupil, accommodating multiple different user pupil positions corresponding to the user's eye movement. The assembly 300 shown in FIG. 3 expands the entrance pupil of plenoptic camera assembly 101 to be coextensive with three different user pupil positions. In particular, arrows 310*a*, 310*b*, and 310*c* represent light from the display at the three different pupils. Light 310*a* passes through retardation film 306*a* before PBS 304*a* directs the component of this light having a first polarization state towards cross prism 302. Similarly, light 310c passes through retardation film 306b before PBS 304b directs a component of this light having a second polarization state towards cross prism 302. Retardation films 306a and 306b can have the effect of randomizing the polarization of light from the display under test. The first and second polarization states can be the same. Light 310b can be a combination of the first and second polarization states or it can be orthogonal.

Cross prism 302 combines the light from PBS 304a and 304b with light 310b, directing this light towards plenoptic camera assembly 101. The cross prism 302 surfaces may be 50% reflective (e.g., 50% transmissive), or may be tuned to create similar transmissions through the three optical paths. Note that the reflective surfaces of the PBSs and cross-prism are planar surfaces, preserving the directional properties of the light rays representing the light field at exit pupil 320. Accordingly, the light entering the camera assembly is composed of light from the three different pupils and a light field image captured from this light will include information from each of these pupils. The performance of a sum of the three pupil positions can therefore be evaluated based on a single light field image.

Assembly 300 is typically positioned in the optical path between the display and the plenoptic camera assembly by a mounting apparatus (e.g., an optomechanical mount) that allows for precise positioning of the assembly at entrance pupil 103. In some embodiments, one or more actuators can be used to automatically switch out various optical components at entrance pupil 103. An example is a filter wheel, which can rotate different filter arrays into and out of the optical path. Manual exchange of these components is also possible.

Generally, system 100 can include additional components in combination with those described above. For example, in some embodiments the system can include an afocal optical relay system between the stage and the plenoptic camera assembly.

Such a relay system can provide additional space in the optical path without significant impact on the imaging properties of the optics. Alternatively, or additional, one or more fold mirrors can be used to fold the optical path of the system, e.g., to provide a more compact form factor for the system.

In general, system 100 can be used to characterize a variety of different performance parameters associated with a display. These performance parameters can include but are not limited to radiance, luminance, color, geometric distortion, virtual image distance, and field curvature. Conventional light field analysis techniques can be used characterize the performance of the display.

In some implementations, super-resolution techniques are used to enhance the accuracy of the pixel location. For instance, geometric correction can demand very accurate pixel location measurements, and can benefit from the use of super-resolution techniques.

Display calibration can be performed by comparing uniformity of one or more performance parameters across the exit pupil of the display and/or comparing the performance parameter to a standard. The operation of the display can be adjusted based on the measurements and additional measurements performed to assess the adjustment. The measurement and adjustment sequence can be repeated until the performance parameter is within a pre-established threshold.

Figure 4:
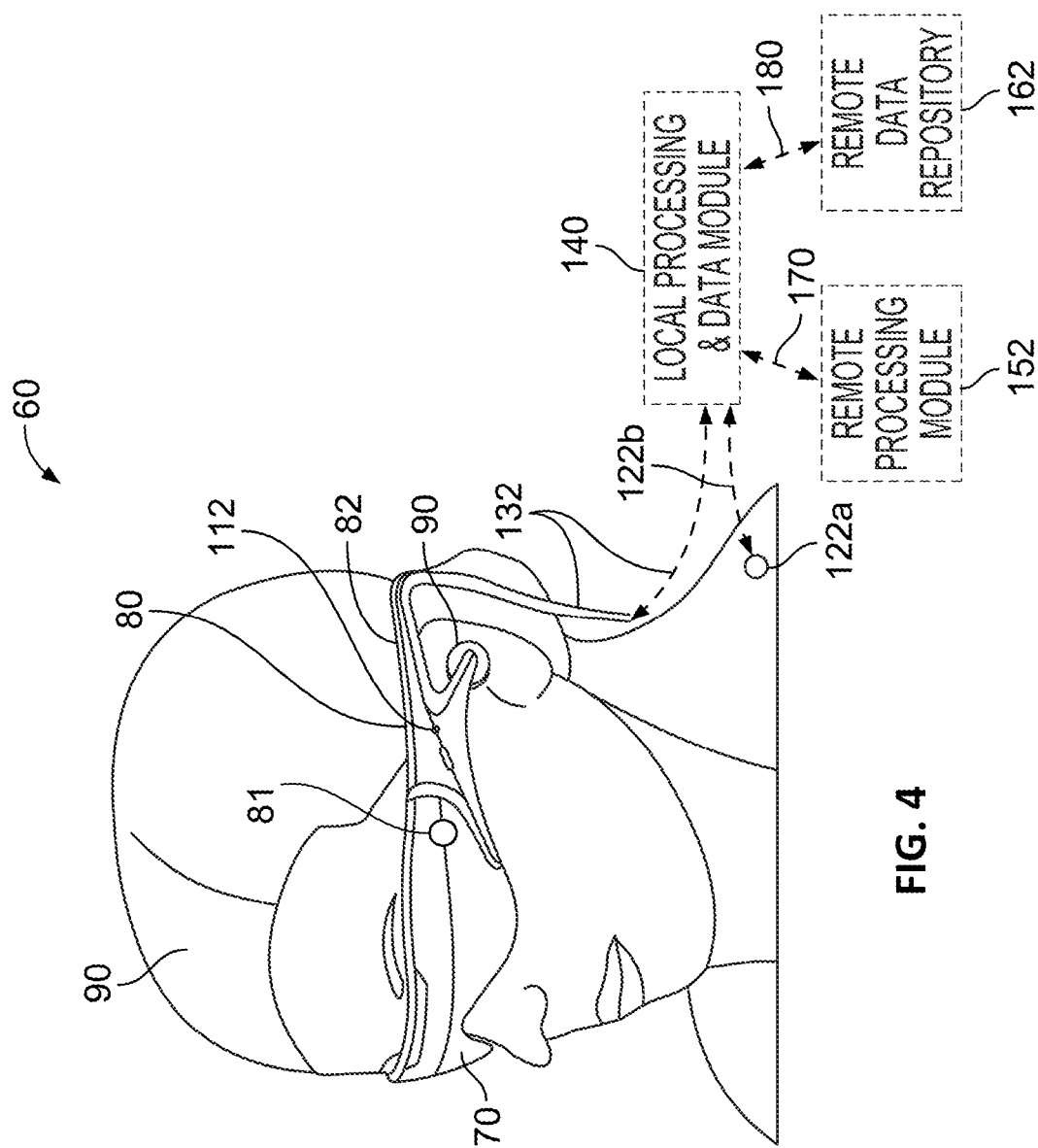
FIG. 4 is a schematic diagram showing an example of a wearable headset display system.

System 100 can be used to measure performance parameters and calibrate displays suitable for augmented reality head mounted display systems. An example of such a system is shown in FIG. 4, which shows an example head-mounted display system 60 that includes a display (or eyepiece) 70, and various mechanical and electronic modules and systems to support the functioning of that display 70. The display 70 is housed in a frame 80, which is wearable by a display system user 20 and which is configured to position the display 70 in front of the eyes of the user 20. The display 70 may be considered eyewear in some embodiments. A world-viewing (e.g., facing the user's environment and having a similar field of view) camera 81 is mounted in frame 80. In some embodiments, a speaker 90 is coupled to the frame 80 and is positioned adjacent the ear canal of the user 20. The display system may also include one or more microphones 112 to detect sound. The microphone 112 can allow the user to provide inputs or commands to the system 60 (e.g., the selection of voice menu commands, natural language questions, etc.), and/or can allow audio communication with other persons (e.g., with other users of similar display systems). The microphone 112 can also collect audio data from the user's surroundings (e.g., sounds from the user and/or environment). In some embodiments, the display system may also include a peripheral sensor 122a, which may be separate from the frame 80 and attached to the body of the user 20 (e.g., on the head, torso, an extremity, etc.). The peripheral sensor 122a may acquire data characterizing the physiological state of the user 20 in some embodiments.

The display 70 is operatively coupled by a communications link 132, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 20 (e.g., in a backpack-style configuration or in a belt-coupling style configuration). Similarly, the sensor 122a may be operatively coupled by communications link 122b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 20), such as image capture devices (e.g., cameras), microphones, inertial measurement units, accelerometers, compasses, GPS units, radio devices, gyros, and/or other sensors disclosed herein; and/or 2) acquired and/or processed using a remote processing module 152 and/or a remote data repository 162 (including data relating to virtual content), possibly for passage to the display 70 after such processing or retrieval. The local processing and data module 140 may be operatively coupled by communication links 170, 180, such as via a wired or wireless communication links, to the remote processing module 152 and the remote data repository 162 such that these remote modules 152, 162 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80 or may be standalone devices that communicate with the local processing and data module 140 by wired or wireless communication pathways.

The remote processing module 152 may include one or more processors to analyze and process data, such as image and audio information. In some embodiments, the remote data repository 162 may be a digital data storage facility, which may be available through the internet or other networking configuration in a "cloud" resource configuration. In some embodiments, the remote data repository 162 may include one or more remote servers, which provide information (e.g., information for generating augmented reality content) to the local processing and data module 140 and/or the remote processing module 152. In other embodiments, all data is stored and all computations are performed in the local processing and data module, allowing fully autonomous use from a remote module.

Other embodiments are in the following claims.

What is claimed is:

1. A system, comprising:
a plenoptic camera assembly comprising a camera lens defining an image plane, a camera sensor, and a microlens array arranged to image light at the image plane to the camera sensor;
a stage for receiving a head-mounted display module;
a filter array positioned in a light path between the camera lens and the head-mounted display module; and
a system controller in communication with the plenoptic camera assembly and programmed to cause, during operation of the system, acquire one or more light field images projected from the head-mounted display module and determine information about a performance of the head-mounted display module based on the acquired light field image.

2. The system of claim 1, the stage configured for positioning the head-mounted display module with respect to the plenoptic camera assembly so that an exit pupil of the head-mounted display module coincides with a pupil of the plenoptic camera assembly.

3. The system of claim 1, wherein the filter array comprises a plurality of spatially discrete filters.

4. The system of claim 3, wherein the plurality of spatially discrete filters extend across an aperture of the camera lens.

5. The system of claim 1, wherein the filter array comprises a spatially discrete color filter, a spatially discrete polarization filter, or a spatially discrete neutral density filter.

6. The system of claim 5, wherein the spatially discrete color filter comprises an X, Y, Z tristimulus color filter.

7. The system of claim 1, wherein the filter array comprises a first array of spatially discrete color filters and a second array of spatially discrete color filters overlapping with the first array, the first and second arrays of spatially discrete filters filtering different properties of the light.

8. The system of claim 7, wherein the properties of the light are selected from the group consisting of color, polarization, and intensity.

9. The system of claim 2, further comprising an optical assembly arranged at the pupil of the plenoptic camera assembly.

10. The system of claim 9, wherein the optical assembly is configured to combine light emitted from multiple different locations of the exit pupil of the head-mounted display module to form multiple overlapping images at a sensor of the plenoptic camera assembly.

11. The system of claim 10, wherein each of the multiple overlapping images corresponds to a different user view for the head-mounted display module.

12. The system of claim 9, wherein the optical assembly comprises one or more polarizing beam splitters arranged at different locations in the exit pupil of the head-mounted display module.

13. The system of claim 12, comprising a beam combiner arranged in the pupil of the plenoptic camera assembly arranged to receive light from each of the polarizing beam splitters and direct the light from each polarizing beam splitter along a common path to the camera lens.

14. The system of claim 1, wherein the filter array is arranged at a pupil of the plenoptic camera assembly.

* * * * *